United States Patent [19]
Ackley et al.

[11] Patent Number: 5,540,805
[45] Date of Patent: Jul. 30, 1996

[54] APPARATUS FOR PRODUCING ADHESIVE LABELS

[75] Inventors: Robert Ackley, Brewerton; James Dokoupil, Liverpool, both of N.Y.

[73] Assignee: The Croydon Company, Inc., Liverpool, N.Y.

[21] Appl. No.: 374,961

[22] Filed: Jan. 19, 1995

Related U.S. Application Data

[63] Continuation-in-part of Ser. No. 69,089, May 28, 1994, abandoned.

[51] Int. Cl.⁶ .................................................. B32B 31/00
[52] U.S. Cl. .......................... 156/554; 156/350; 156/361; 226/25
[58] Field of Search ................................. 156/277, 384, 156/387, 271, 494, 554, 555, 324, 550, 551, 543, 549, 541, 577, 350, 361; 400/606, 616, 616.1, 633; 226/8, 25, 26, 159

[56] References Cited

U.S. PATENT DOCUMENTS

| | | | |
|---|---|---|---|
| 652,121 | 6/1900 | Koenig | 156/577 |
| 1,926,245 | 9/1933 | Schmitt | 156/554 X |
| 2,245,818 | 6/1941 | Pfeiffer | 400/616.1 X |
| 4,165,028 | 8/1979 | Doherty | 226/8 X |
| 4,564,411 | 1/1986 | Holzer | 156/387 |
| 5,076,879 | 12/1991 | Svyatsky | 156/541 X |
| 5,123,762 | 6/1992 | McCartney | 400/616 |

Primary Examiner—James Engel
Attorney, Agent, or Firm—Charles S. McGuire

[57] ABSTRACT

Apparatus for supporting rolls of overlay and base tapes, and guiding the tapes to pressure rollers after the base tape passes through a computer printer to produce an endless web of protected labels. The pressure rollers may be rotated either manually or by an electric motor. Between the printer outlet and the pressure rollers, the base tape passes through a bail mechanism which is rotationally moveable by the relative tension and slack in the base tape to operate a microswitch in the motor circuit. Both the label-making apparatus and the printer rest upon a planar base member to which the apparatus is fixedly attached.

20 Claims, 5 Drawing Sheets

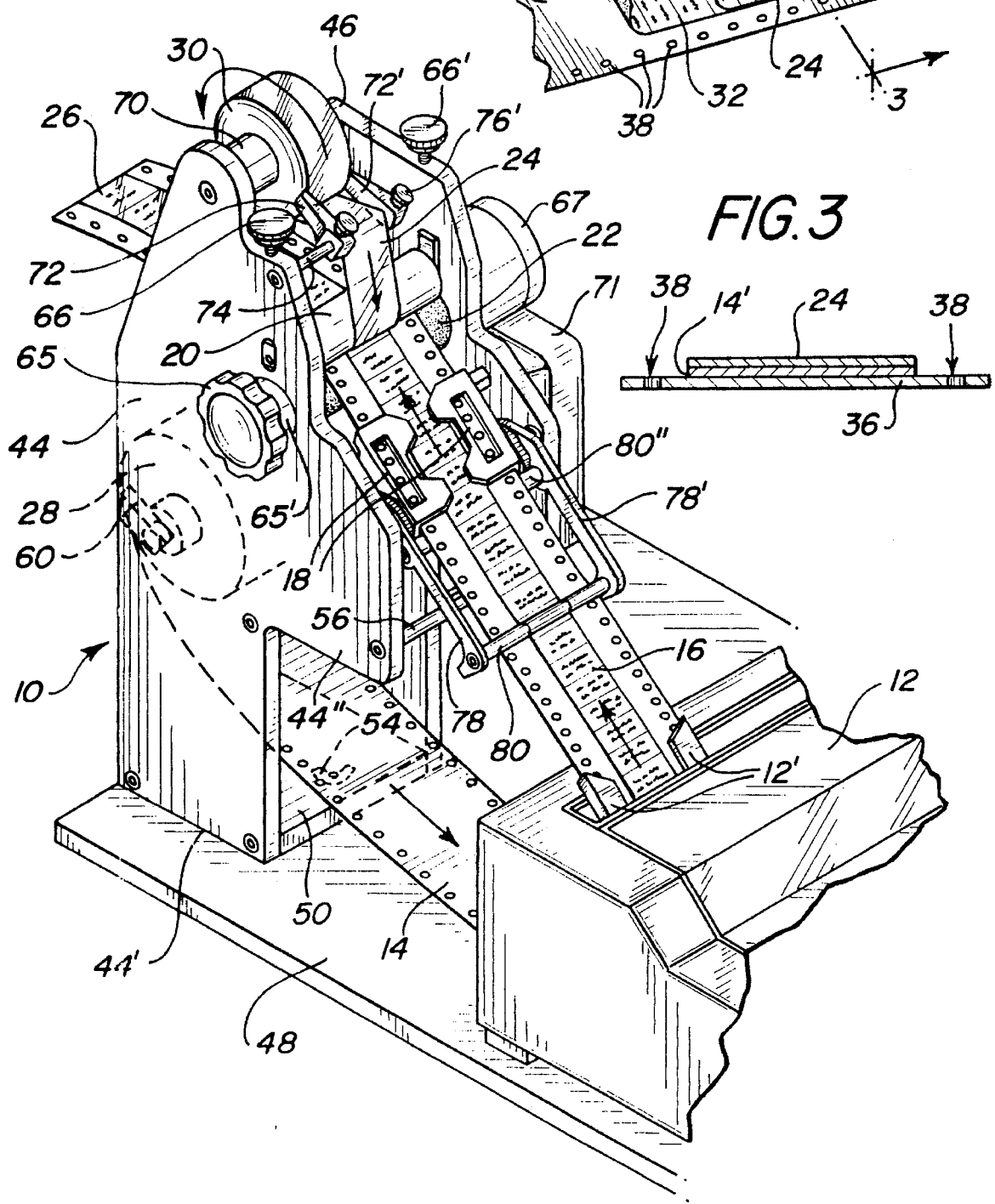
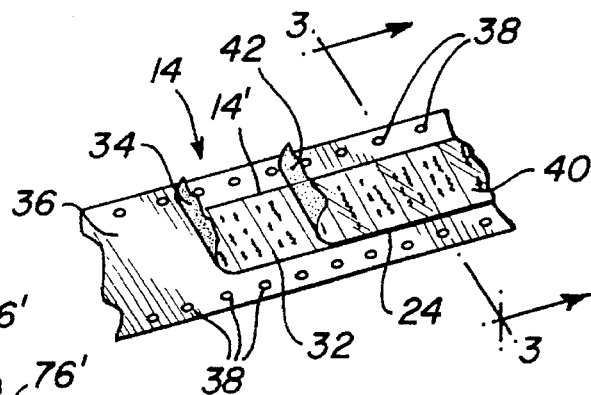

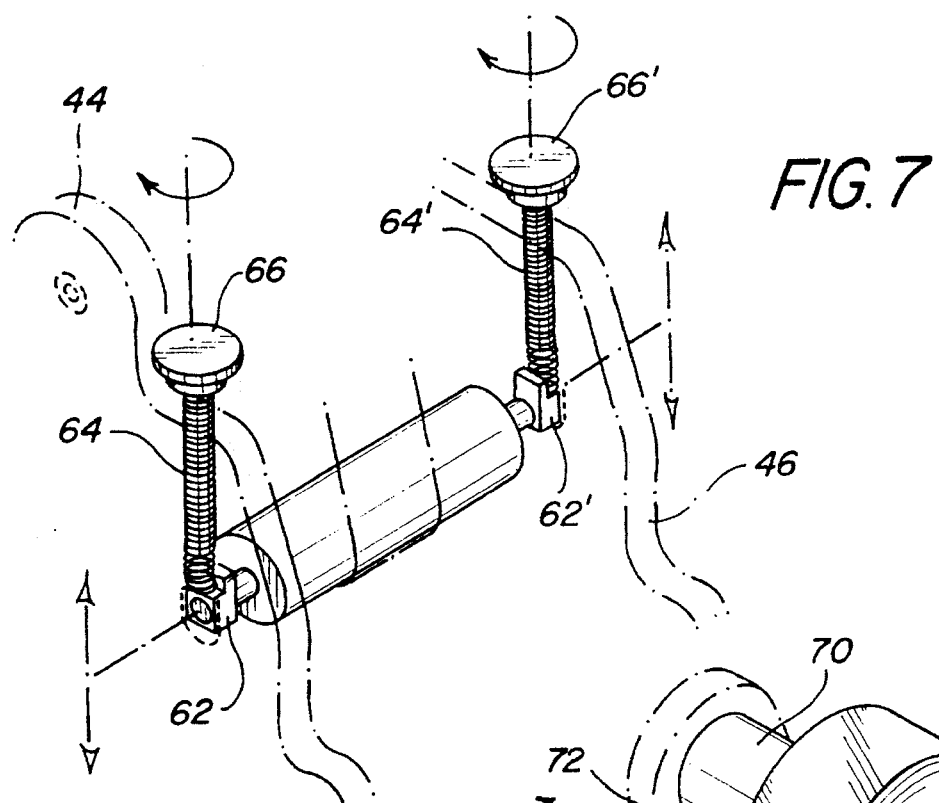
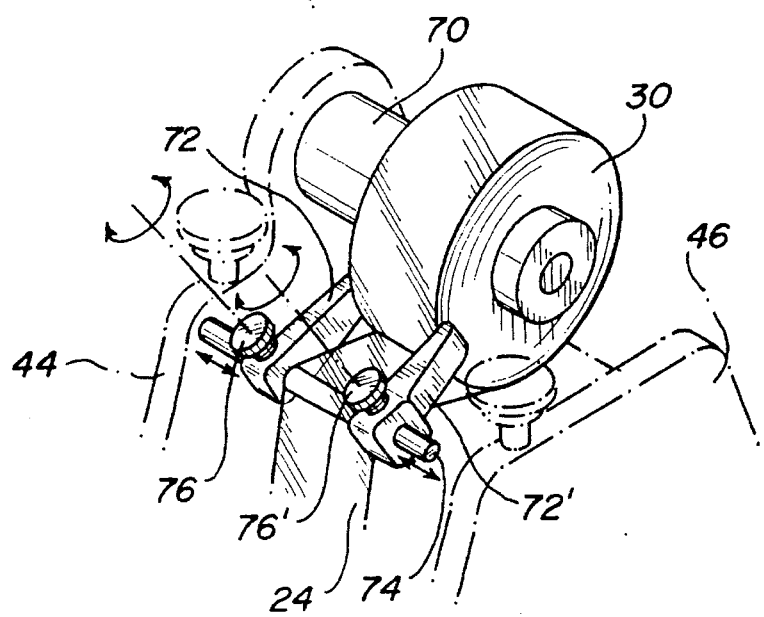
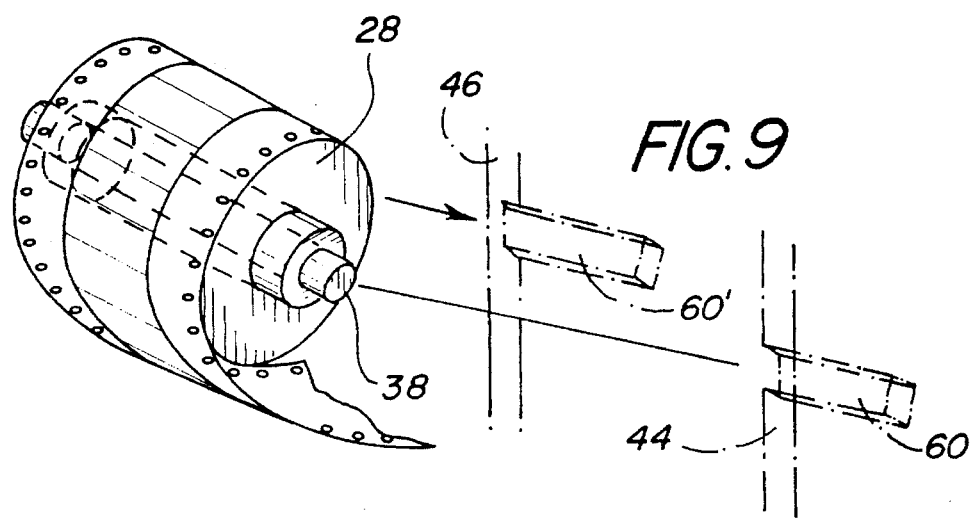

APPARATUS FOR PRODUCING ADHESIVE LABELS

REFERENCE TO RELATED APPLICATION

The present application is a continuation-in-part of application Ser. No. 08/069,089, filed May 28, 1994, of the same inventors, now abandoned.

BACKGROUND OF THE INVENTION

This invention relates to apparatus which produces labels by adhesively bonding a transparent overlay tape material in covering relation to the printed surface of an opaque base tape material and, more particularly, to such an apparatus which is a unitary, stand-alone unit for positioning adjacent a computer printer having a tractor-type paper feed mechanism. The apparatus is operable to concurrently deliver a continuous web of blank base tape material to the printer, receive the web of printed base tape material therefrom, and adhesively apply a continuous web of transparent overlay tape material thereto thereby producing a continuous web of smudge-proof, dirt-resistant labels which are cut or otherwise separated from the web into individual labels for application to a substrate such as the binding of a library book, for example.

The type of base and overlay tape materials preferably used to make the labels with the present invention are disclosed in prior U.S. Pat. No. 4,564,411. The '411 patent discloses three different embodiments of label producing apparatus which operate by detachably mounting to a typewriter or printer having rolling, movable and fixed platens. In each of the embodiments, individual spools of the base tape material and overlay tape material are rotatably mounted upon respective spindles and are unwound therefrom and ultimately directed between an upper, pressure-loaded roller and a lower drive roller which are rotatably mounted with tangent surfaces in rolling engagement with one another. In two of the three embodiments which detachably mount to typewriters having rolling, and moving and rolling platens, respectively, the typewriter platen serves as the drive roller. In the embodiment which detachably mounts to a printer having a fixed platen and sheet-feeding tractor mechanism, the drive roller shaft of the label producing apparatus coaxially connects to the drive shaft of the sheet-feeding tractor mechanism of the printer. The base tape material spool is mounted via a second assembly to an internal portion of the printer housing with the base tape material being directed upwardly therefrom, between the fixed platen and printer head of the printer, and between feed rollers which are located thereabove on the printer housing.

While the invention of the '411 patent improved upon such label producing apparatus in existence at that time in the manners stated therein, there remain obvious drawbacks in having to mount the label producing apparatus, albeit non-permanently, to the typewriter or printer. For example, besides the set-up time involved in mounting the label producing apparatus to the typewriter/printer, a certain level of mechanical ability is required which may pose difficulties for a large segment of the user population. Also, certain portions of the label producing apparatus are directly attached to the typewriter/printer requiring, in at least some instances, that holes be drilled into portions of the typewriter/printer. Furthermore, since the label producing apparatus of the '411 patent is operably connected to the typewriter/printer, it is necessary that sizes, diameters and tolerances between the connected working components be substantially compatible.

SUMMARY OF THE INVENTION

It is therefore a principal object of the present invention to provide a device for producing smudge-proof, durable adhesive labels from spools of base tape material having a printable surface and transparent overlay tape material, which device is a unitary, stand-alone unit for use in combination with a computer printer having a sheet-feeding tractor mechanism and which need only be placed in nearby proximity to the printer.

It is another object of the present invention to provide a label producing apparatus of the above type which concurrently directs and feeds a continuous web of blank base tape material from the apparatus to the printer, receives a web of printed base tape material therefrom, and applies a web of transparent overlay tape material thereto.

It is a further object of the present invention to provide a label producing apparatus of the above type which includes a minimum of parts and is designed for quick and easy replacement of parts and materials.

It is yet another object of the present invention to provide a label producing apparatus of the above type which requires only a bare minimum level of mechanical competence to set up and use.

It is yet a further object of the present invention to provide a label producing apparatus of the above type which requires very little time to set up and use.

It is still another object of the present invention to provide a label producing apparatus of the above type which is light-weight, compact, and thus easily transportable from use with one printer to another.

It is still a further object to provide a label producing apparatus of the above type which requires no tools to mount and replace the spools of material thereon, and to load the materials through the apparatus and printer.

Still another object is to provide label-producing apparatus which may be placed in closely adjacent, non-contacting relation to a computer printer which places printed indicia on the labels.

A further object is to provide apparatus for producing a continuous web of protected, printed labels from initially separate spools of base and overlay tapes wherein the paths of travel of the individual tapes and the composite web are conducive to smooth and continuous operation.

An additional object is to provide a label-producing system including a computer printer capable of sustained periods of unattended operation.

Other objects will in part be obvious and in part appear hereinafter.

In accordance with the foregoing objects, the invention comprises an apparatus for producing smudge-proof, extremely durable adhesive labels from continuous webs of base tape and transparent overlay tape materials. The tape materials are provided in continuous web form on respective spools having respective rigid, annular core members onto which the tape material webs are wound at the point of manufacture. The base tape material comprises a web of label material having opposite print-receiving and adhesive surfaces, and a web of carrier material removably secured in covering relation to the adhesive surface to protect the integrity thereof prior to use, and to provide web-travel alignment means as described more fully later. The transparent overlay tape material comprises a continuous web of transparent material having opposite adhesive and non-adhesive surfaces.

The label producing apparatus is a unitary, stand-alone unit which is positioned in close proximity to a computer printer having a conventional, sheet-feeding tractor mechanism. The apparatus includes frame means comprising side panels with opposing surfaces in spaced, parallel, vertical planes and extend upwardly from a flat base which is placed upon a horizontal surface. The base is large enough to also support the printer. The remaining components of the apparatus are mounted to and supported by the side panels above the horizontal surface upon which the apparatus is laid.

More particularly, the apparatus includes forward and rear spindles which are fixed to extend along spaced, parallel axes, and on which the overlay tape and base tape material spools are rotatably mounted, respectively. The web of blank base tape material (comprising the label layer having an adhesive surface and the carrier layer applied thereto) is initially directed from its spool to the inlet of the printer where it is fed between the printer platen and printer head in the usual manner of paper feeding for a printer having sheet-feeding tractor mechanism. In this regard, the carrier layer portion of the base tape material includes two continuous series of longitudinally spaced, laterally aligned perforations extending closely adjacent the two opposite, parallel side edges thereof, which register with equally longitudinally spaced alignment pins on the pair of laterally spaced tracks of the sheet-feeding mechanism. The tracks of the feeding mechanism are endless belts and, as the belts rotate, the pins thereon feed the paper through the printer.

After the label layer has been printed with the desired indicia, it passes through the printer outlet and is directed to a web guide means in the form of a non-powered, sheet-feeding tractor mechanism substantially identical to the powered sheet-feeding mechanism on the printer. The printed base tape material web is removably engaged by pins of the web guide means in the same manner as it is engaged by the paper feed mechanism of the printer. The base tape guide means of the label producing apparatus is located forwardly of and below the spindle carrying the spool of transparent overlay tape material, and immediately forwardly adjacent a pair of feed rollers which act together to apply pressure to the webs of overlay tape material to the printed base tape material as they pass between the rollers.

More particularly, the feed rollers comprise a first, motor-driven roller and a second, spring-loaded friction roller which are rotatably mounted between the side panels with the cylindrical, outer surfaces of the rollers in tangented contact with each other. The drive roller is connected to an electric motor which is mounted adjacent the outer surface of one of the side panels for turning the roller to feed the base tape and overlay tape materials together between the feed rollers in the manner described more fully below. The spring-loaded roller is adjustably biased against the drive roller and rotates with and in a direction opposite to the drive roller due to the high friction material from which each roller is made (e.g., 50 durometer rubber). The overlay tape material web is directed from its spindle downwardly around a guide shaft extending parallel thereto and which includes means for adjustably maintaining the lateral alignment of the web as it travels from its spool towards the feed rollers, where its path meets that of the web of printed base tape material.

The longitudinal path of travel of the base tape from the printer outlet to the pressure rollers is directed upwardly at an acute angle. The upper surfaces of the endless belts which guide the base tape to the pressure rollers lie in the plane of this portion of the base tape path of travel. The base tape is fed out of the printer by the motorized tape feed mechanism therein, and is pulled over the non-powered guide belts by the frictionally engaged, motor-driven feed rollers.

A so-called bail mechanism comprises a pair of arms mounted for freely pivotable movement about an axis transverse to the base tape path of travel at or near the guide means, and a rod extending between the ends of the arms opposite the pivotal mountings. The rod rests upon the base tape at a position between the printer outlet and the guide means. When slack develops in this portion of the base tape, i.e., when the base tape is fed from the printer faster than it is drawn through the pressure rollers, the rod of the bail mechanism lowers by gravity, causing the arms to rotate about their pivotal mountings and actuate an on/off switch in the circuit of the pressure roller drive motor. This has the effect of causing the motor to rotate the feed rollers until the slack is removed from the base tape, raising the rod and counter-rotating the arms of the bail mechanism to turn off the switch controlling motor operation. This permits the apparatus to operate for extended periods without direct supervision, i.e., an operator may be entering new labeling data into the computer which drives the printer or leave the immediate vicinity of the apparatus as it continues to operate.

The overlay tape material is directed between the feed rollers concurrently with the base tape material which is directed therethrough by the paper feed mechanism located immediately forwardly adjacent thereto. The spool of overlay tape material is mounted upon its respective spindle such that the adhesive surface of the overlay tape material is placed in contact with the printed surface of the base tape material as the two materials meet and connect at the juncture of the feed rollers. The feed rollers thereby effect the substantially permanent adhesion of the transparent overlay tape material web to the label layer as the webs travel between the rollers. The resultant web may thereafter be cut into individual labels as desired and adhered to a desired substrate after removing the carrier layer from the adhesive surface of the label layer of the base tape web.

BRIEF DESCRIPTION OF THE DRAWINGS

FIG. 1 is a perspective view of the inventive label producing apparatus shown positioned in nearby proximity to a computer printer (fragmented), with continuous webs of base tape and overlay tape being fed therethrough in the intended manner;

FIG. 2 is a fragmented, perspective view of the base tape and overlay tape webs adhered to each other in accordance with the invention;

FIG. 3 is a cross-sectional view as taken along the line 3—3 of FIG. 2;

FIGS. 7–10 are perspective views of various portions of the apparatus.

DETAILED DESCRIPTION

Figure 4:
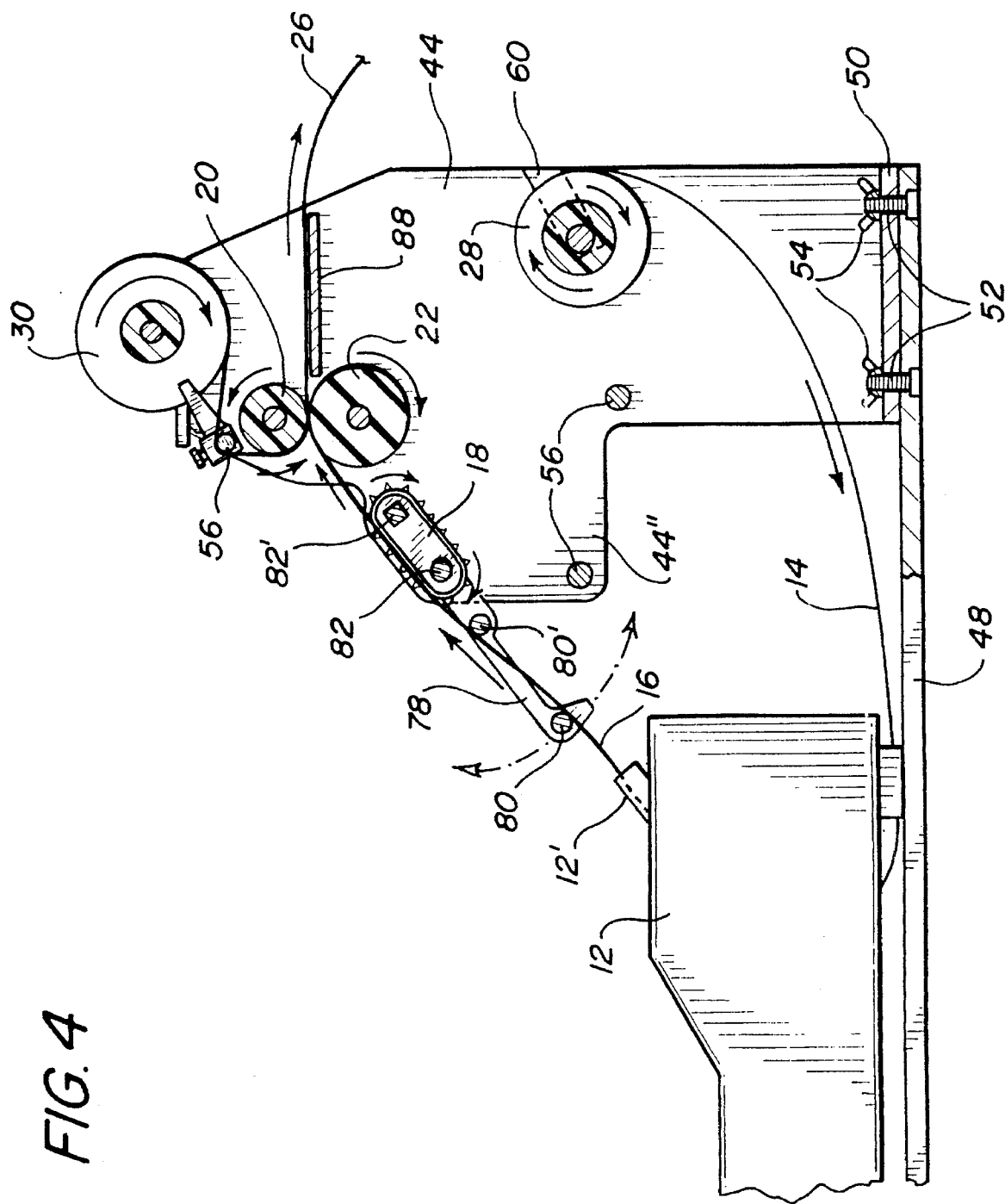
FIG. 4 is a side elevational view of the apparatus FIG. 1 in vertical section through the center.

Referring now to the drawings, there is seen in FIG. 1 an apparatus for producing labels denoted generally by the reference numeral 10 positioned in nearby proximity to a conventional computer printer 12. Generally speaking, apparatus 10 is operable to supply an elongated web of blank base tape 14 to printer 12, receive printed base tape 16 therefrom, direct the printed base tape web 16 over web alignment means 18 and between a pair of tangentially contacting feed rollers 20 and 22, while simultaneously directing and applying a web of transparent overlay tape 24 over the printed surface of the base tape web between the feed rollers thereby creating a smudge-proof, durable label web 26 which is to be cut or otherwise separated into individual labels for subsequent application to a desired object.

The blank base tape and transparent overlay tape webs 14 and 24 are wound in the form of spools 28 and 30, respectively, at the point of manufacture. As seen best in FIGS. 2 and 3, web 14 comprises two separate webs, i.e., an elongated label layer 14' having opposite print-receiving and adhesive surfaces 32 and 34, respectively, and an elongated carrier layer 36 disposed in covering relation to the adhesive surface 34 to protect the integrity thereof prior to use. As mentioned above, and as will be more fully discussed below, apparatus 10 is operable to adhere transparent overlay tape web 24 in superposed relation to label layer 14'.

Overlay tape web 24 includes opposite non-adhesive and adhesive surfaces 40 and 42, respectively. Overlay tape web 24 and label layer 14' are of substantially the same widths and are longitudinally centered along carrier layer 36. In this regard, it is seen that carrier layer 36 includes two continuous series of longitudinally, equally spaced and laterally aligned perforations 38 adjacent opposite side edges thereof on opposite sides of overlay tape and label layer webs 24 and 14', respectively. Perforations 38 serve to laterally align the base tape webs through printer 12 and apparatus 10 by removably registering with pins located on the feed mechanism 12' and web guide 18 on printer 12 and apparatus 10, respectively, as will be more fully described below.

The adhesive applied to surface 34 of label layer 14' is preferably both pressure-sensitive in order to releasably adhere to carrier layer 36, and heat-sensitive, in order to form a strong bond when adhered to a substrate such as a book binding, for example. Label layer 14' is also preferably formed of TEBLAR®, manufactured by DuPont, due to its strong durability characteristics and print quality. The adherence of transparent overlay tape 24 over the printed label layer 14', as carried out by the present invention, ensures a smudge-proof, dirt-resistant and durable label which will stand up to years of normal handling.

Figure 6:
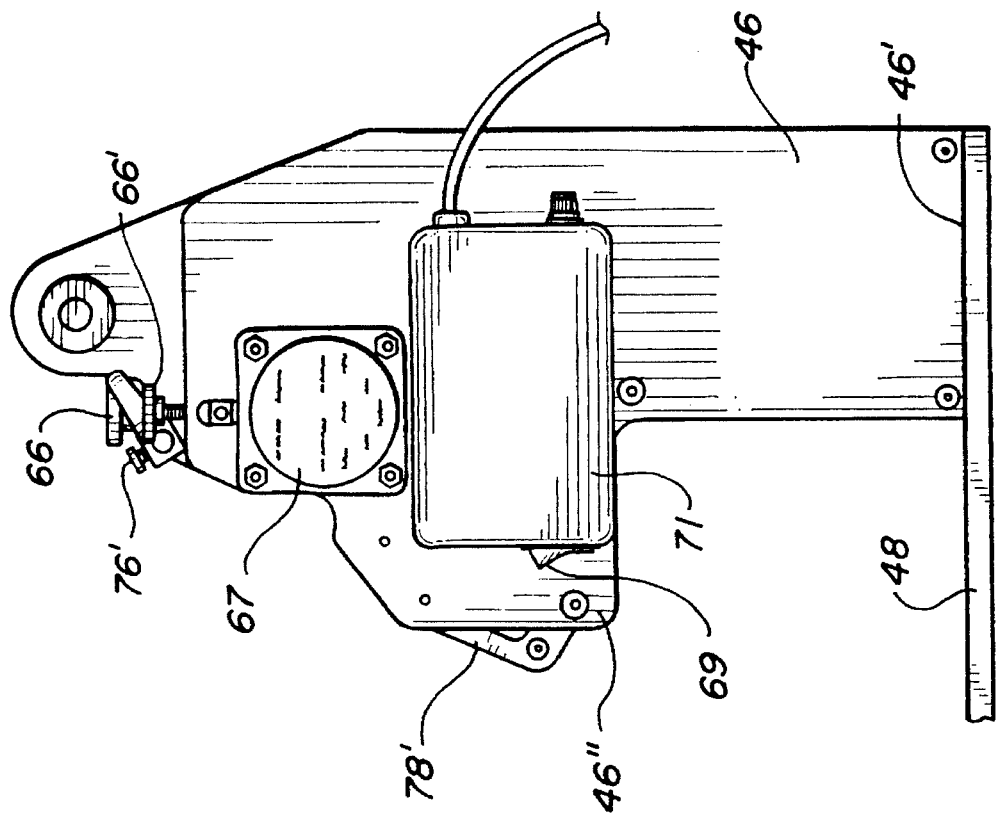
FIG. 6 is a side elevational view of the opposite side of the apparatus shown in FIG. 5.
Figure 5:
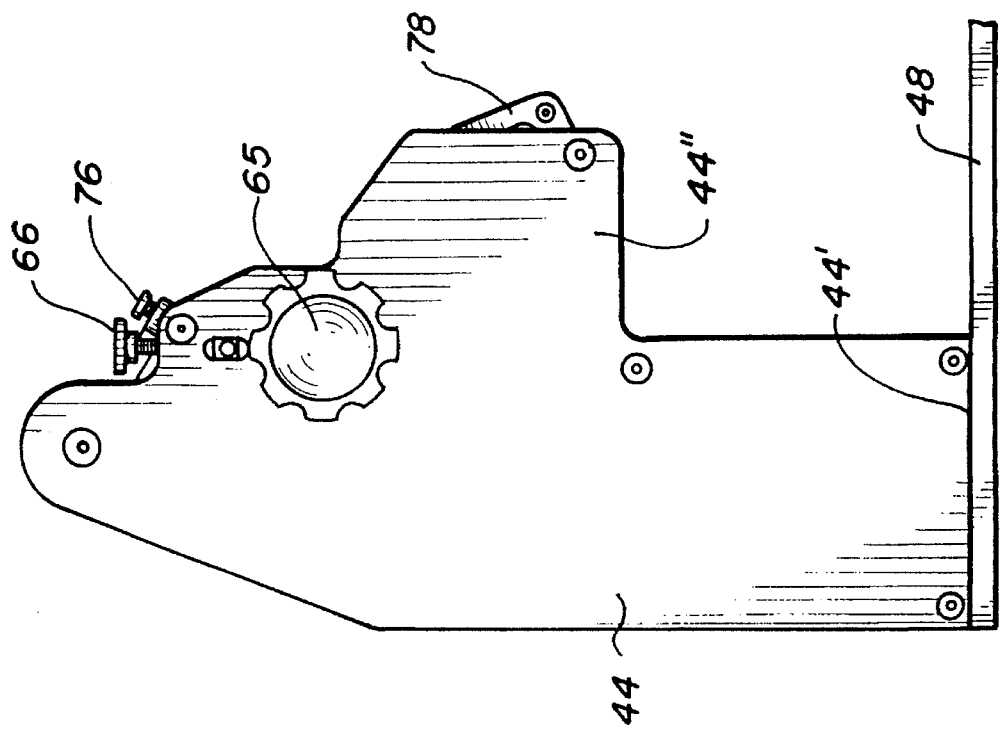
FIG. 5 is a side, elevational view of the label producing apparatus.
Figure 10:
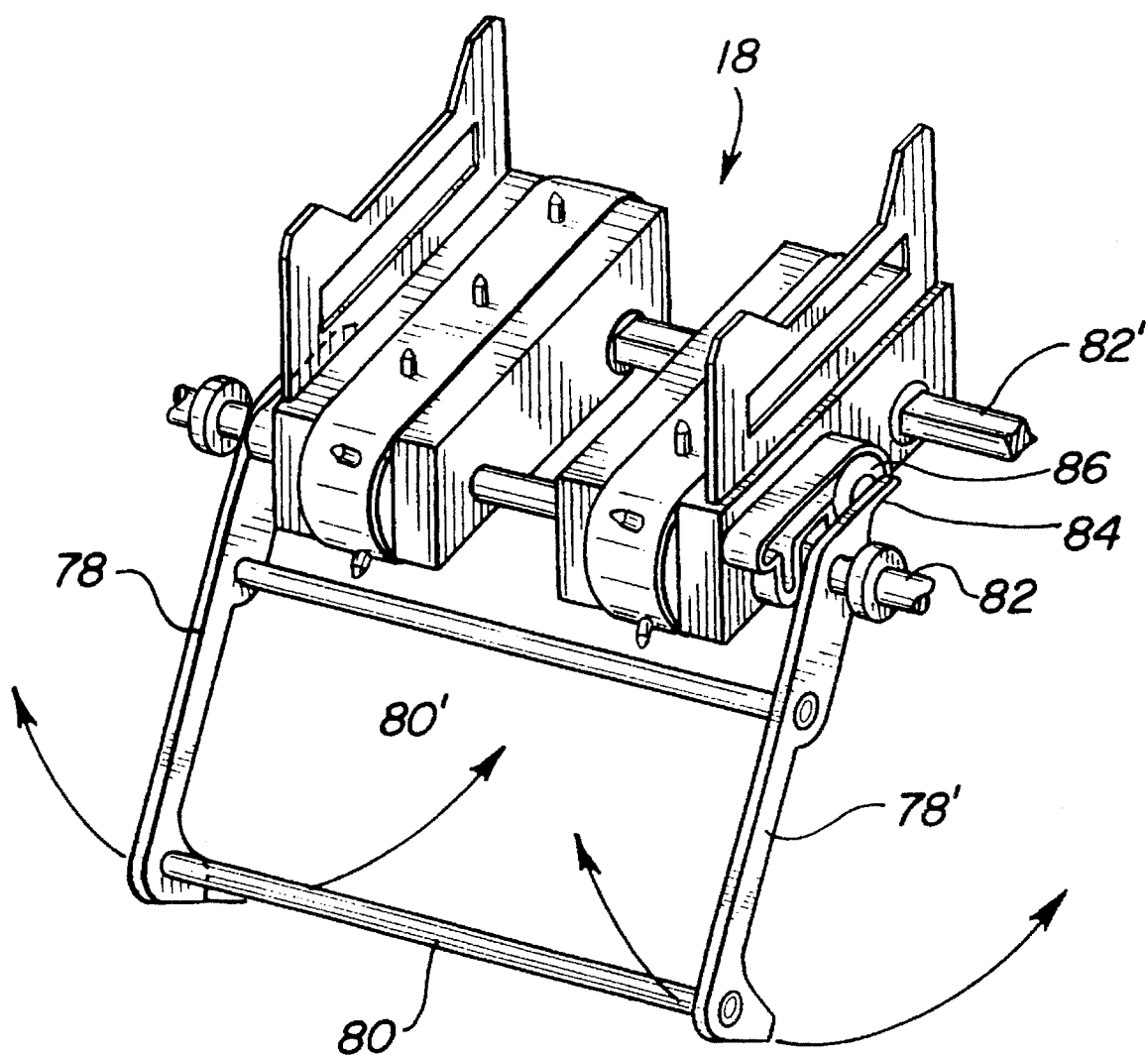

Referring again to FIG. 1, and now also to FIGS. 4–6, label producing apparatus 10 is seen to include a pair of side panels 44 and 46 which are of similar outline and fixed in spaced relation with inner, opposing surfaces in parallel vertical planes. Panels 44 and 46 include linear bottom edges 44' and 46', respectively, supported on flat base member 48 which may be set upon a horizontal surface such as a table or desk top. Plate 50 is fixedly attached to side panels 44 and 46 between lower edges 44' and 46' to lie flat upon base member 48. As best seen in FIG. 4, bolts 52 extend through aligned openings in base member 48 and plate 50 and are engaged by wing nuts 52 to provide releasable, rigid attachment of the frame means (comprising panels 44 and 46 and plate 50) upon base member 48. A plurality of rods 56 extend between the opposing surfaces of panels 44 and 46, providing further rigidity to the frame and maintaining the desired spacing and parallelism of the side panels.

Base tape spool 28 is carried by spindle 58 which is mounted between side panels 44 and 46 by inserting opposite end portions of the spindle into slots 60 and 60' (see FIG. 9) in the opposing surfaces of panels 44 and 46. Slots 60 and 60' extend from open ends in what is considered the rear side of apparatus 10, in an angularly downward direction toward the front side, to closed ends at which spindle 58 is supported for free rotation about an axis perpendicular to the opposing walls of panels 44 and 46. Base tape 14 is unwound from the lower side of spool 28, through the lower part of apparatus 10, to the inlet on the lower side of printer 12. Base tape 14 exits the outlet of printer 12 at a rate determined by the speed of the motor (not shown) driving tape feed mechanism 12'. Side panels 44 and 46 include forwardly extending portions 44" and 46", respectively, at a position above base member 50 to permit closer physical proximity of apparatus 10 and printer 12 while providing the necessary access at the lower side of the printer.

Upper feed roller 20 is mounted for free rotation upon a shaft supported at opposite ends in blocks 62 and 62' (see FIG. 7) which are positioned in recesses in side panels 44 and 46, respectively. Elongated screws 64 and 64' are threadedly engaged in vertically extending openings in side panels 44 and 46. The lower ends of screws 64 and 64' bear against blocks 62 and 62', respectively, so that the pressure of roller 20 on roller 22 may be selectively adjusted by manual manipulation of head portions 66 and 66' on screws 64 and 64'. Coil springs 68 and 68' encircle the lower portions of screws 64 and 64', respectively, to provide tension on the screws.

Lower guide roll 22 is carried upon a shaft having opposite end portions, one of which extends through side panel 44 and is engaged by set screw 65' (FIG. 1) in knob 65. The other end portion of roller 22 extends through side panel 46 and is operatively engaged, through appropriate gearing, with the output shaft of conventional electric motor 67. Power to motor 67 is controlled both through manual on/off switch 69 on housing 71 (FIG. 6), and through an automatically controlled microswitch described later. The base and overlay tape layers are adhesively supoerposed to provide label tape 26 as they pass between feed rollers 20 and 22 being fed either manually by turning knob 65 or by powered means through motor 67.

As best seen in FIG. 8, spool 30 of overlay tape 24 is mounted upon spindle 70, extending in cantilever fashion from the upper part of side panel 44. Guide members 72 and 72' are slidingly mounted upon rod 74, likewise extending from side panel 44. Manually engageable set screws 76 and 76' are provided for selectively fixing the lateral position of guide members 72 and 72' upon rod 74. Wing portions of guide members 72 and 72' retain spool 30 in the desired lateral position upon spindle 70 and the edges of overlay tape 24 pass between opposing surfaces of guide members 72 and 72' which are spaced by the width of the overlay tape. The longitudinal path of travel of tape 24 is thus established in the desired position by guide members 72 and 72'.

Between the outlet of printer 12 and its engagement with guide means 18, the printed base tape web 16 passes through a pivotally mounted bail mechanism including a pair of parallel arms 78 and 78', separated by rods 80 and 80'. Arms 78 and 78' are mounted, adjacent the ends thereof opposite rod 80, upon rod 82 which extends between side panels 44 and 46 and also supports, together with rod 82', portions of guide means 18 As seen in FIGS. 1 and 4, the path of direct travel of printed base tape 16 from the outlet of printer 12, through guide means 18, to the position of tangency of feed rollers 20 and 22 is directed upwardly and rearwardly at an acute angle. The upper surfaces of the endless belts of guide means 18 lie substantially in the plane of this path of travel.

Printed base tape 16 is directed under rod 80 and over rod 80' between printer guide means 12' and guide means 18. Thus, the tension in this portion of tape 16 controls the rotational position of the bail mechanism. Rearwardly projecting end portion 84 of arm 78' is positioned for movement in and out of contact with an actuating portion of fixedly mounted microswitch 86. When slack is present in tape 16, arms 78 and 78' are rotated by gravity in a direction moving rod 80 downwardly and end portion 84 of arm 78' upwardly. This has the effect of closing the microswitch, providing power to motor 67 and rotating feed rollers 20 and 22, thereby advancing the superposed tapes through the rollers.

Preferably, conventional power supply circuitry within housing 71 includes time delay means for starting motor 67 at a low speed and bringing it to full operating speed in a few seconds. The tapes are then moved through the feed rollers at a speed faster than tape 16 is fed out of printer 12. Thus, slack is gradually removed from tape 16 until it has reached its essentially direct path of travel, as shown in FIGS. 1 and 4. As the slack is removed, tape 16 lifts rod 80, thereby rotating arms 78 and 78' and lowering end portion 84 to contact and move microswitch 86 to the open position. Power to motor 67 is thus removed and feed rollers 20 and 22 cease to rotate. As tape 16 is fed from printer 12, slack is again developed until end portion 84 moves out of contact with microswitch 86, allowing the latter to close and again provide power to motor 67.

As the completed web of label tape 26 passes rearwardly out of feed rollers 20 and 22, it is supported by plate 84 (seen only in FIG. 4), and travels rearwardly out of apparatus 10 without interference with any other tapes or portions of the apparatus. interference with any other tapes or portions of the apparatus. Thereafter, the web 26 may be cut or otherwise separated into individual labels. The labels are then applied to a substrate by simply peeling off carrier layer 36 and applying the adhesive surface 34 of the label layer 14' to the substrate. After data for operating printer 12 has been entered, apparatus 10 will function unattended for extended periods under the periodic power of motor 67. Knob 65 may be manually rotated to advance the tapes through feed rollers 20 and 22 at the outset of operation or when motor 67 is not functioning.

What is claimed is:

1. Apparatus for producing a continuous, multi-layer web (26) including a base tape (14) and a transparent overlay tape (24), said apparatus comprising:
    a) a planar base member (48) adapted to rest on a horizontal surface;
    b) rigid frame means (44, 46, 50) including a pair of wall members having respective, laterally spaced, parallel, opposed surfaces, and forward and rear sides;
    c) means (52, 54) for rigidly attaching said frame means to said base member with said opposed surfaces in vertical planes and said wall members extending from said base to respective, upper ends;
    d) means (70) for mounting a spool of said overlay tape between said wall members for rotation about a first axis perpendicular to said opposed surfaces and adjacent said upper ends of said wall members;
    e) means (58) for mounting a spool of said base tape between said wall members for rotation about a second axis, parallel to and at a vertical level below said first axis;
    f) a pair of pressure rollers (20, 22) mounted between said wall members for rotation about respective, third and fourth axes, parallel to and at vertical levels between said first and second axes, said pressure rollers having tangentially contacting surfaces at a predetermined location;
    g) first (72, 72') and second (18) guide means establishing respective longitudinal paths of movement of said overlay and base tapes from said spools to said predetermined position in a direction from said forward side of said wall members for passage in superposed relation between said pressure rollers in a direction toward said rear side of said wall members;
    h) motor means for advancing said overlay and base tapes between said pressure rollers; and
    i) means for controlling operation of said motor in response to the tension in said base tape in advance of said predetermined position, said motor controlling means comprising a member extending laterally across said base tape path of longitudinal movement for contact by said base tape and movement therewith transverse to said base tape path of longitudinal movement as said base tape tension varies.

2. The apparatus of claim 1 wherein said attaching means comprises threaded fasteners for releasably attaching said frame means to said base member.

3. The apparatus of claim 2 wherein said frame means includes a plate extending between and affixed to said wall members and lying upon said base member, and said threaded fasteners extend through said base member and said plate.

4. The apparatus of claim 1 wherein said motor means comprise an electric motor mounted upon one of said wall members.

5. The apparatus of claim 1 wherein said member rests upon said base tape and is moveable by gravity in response to movement of said base tape in a direction transverse to said base tape longitudinal path of movement.

6. The apparatus of claim 5 wherein said motor controlling means further comprises an arm mounted for movement about a pivot axis and said member extends laterally from said arm at a position spaced from said pivot axis.

7. The apparatus of claim 1 and further including support means positioned between said wall members rearwardly of said pressure rollers for support of said continuous tape as the latter moves toward said rear side of said wall members.

8. The apparatus of claim 1 wherein said base tape mounting means comprise a spindle extending between opposite ends, through said spool of base tape, and a pair of slots extending from respective open ends to closed ends in said opposing surfaces to receive and support said spindle opposite ends.

9. The apparatus of claim 1 wherein said second guide means includes a pair of laterally spaced, endless belts having upper surfaces respectively supporting marginal edge portions of said base tape, said upper surfaces lying in a common plane extending upwardly at an acute angle toward said predetermined position.

10. A system for producing a multi-layer, continuous web (26) bearing a succession of longitudinally spaced labels printed on a base tape (14, 16) and covered by a transparent overlay tape (24), said system comprising:
    a) a printer (12) including a casing having an inlet and an outlet for said base tape and means intermediate of said inlet and outlet for inscribing printed indicia on a print-receiving surface (32) of said base tape;
    b) rigid frame means including a pair of wall members (44, 46) having opposed surfaces in spaced, vertical planes, upper and lower ends, and forward and rear sides, said frame means being positioned with said forward side facing said printer;

c) means (70) for mounting a first spool of said overlay tape between said wall members for rotation about a first axis perpendicular to said opposed surfaces at a first vertical level;

d) means (58) for mounting a second spool of said base tape between said wall members for rotation about a second axis, parallel to said first axis at a second vertical level, lower than said first level;

e) a pair of pressure rollers (20,22) having tangentially contacting cylindrical surfaces and mounted between said wall members for rotation about respective, third and fourth axes, both of which are parallel to and at vertical levels between said first and second levels;

f) first guide means (72, 72') establishing a longitudinal path of travel of said overlay tape from said first spool to move between pressure rollers in a direction generally from said forward toward said rear side of said frame means;

g) second guide means (18) establishing a longitudinal path of travel of said base tape from said second spool to said inlet and outlet of said printer to receive said indicia on said print-receiving surface and thence between said pressure rollers with said overlay tape covering said print-receiving surface;

h) motor means (65, 67) for rotating said pressure rollers to feed said overlay and base tapes therebetween i) a planar base member (48) adapted to rest on a horizontal surface, said frame means being fixedly attached to said base member, and said printer resting upon and physically unattached to said base member, said frame means and printer being physically spaced from one another;

j) said base tape being reciprocally moveable transversely to said first path in a predetermined portion of said first path in accordance with the relative amounts of slack and tension in the part of said base tape in said portion of said first path;

k) a moveable member positioned for physical contact with and movement by said part of said base tape in response to said reciprocal movement of said base tape in said predetermined portion of said first path; and l) activating means for controlling operation of said motor means in response to the position of said moveable member.

11. The system of claim 10 wherein said vertical levels of said third and fourth axes are above the vertical level of said printer outlet.

12. The system of claim 11 wherein said longitudinal path of travel of said base tape between said printer outlet and said pressure rollers is in an upwardly angled direction.

13. The system of claim 12 wherein said second guide means include a pair of laterally spaced, non-powered endless belts each carrying spaced pins for engaging a row of perforations along each side of said base tape, and having upper surfaces substantially in the plane of said base tape path of travel.

14. The system of claim 10 wherein said means for rotating said pressure rollers comprise alternatively operable manual and motor powered means.

15. The system of claim 10 and further including means rearwardly adjacent said pressure rollers for supporting said web as the latter passes through and moves rearwardly of said pressure rollers.

16. The system of claim 10 wherein each of said wall members include portions extending forwardly, toward said printer, at positions above said wall member lower ends.

17. Apparatus for producing a continuous, multi-layer web (26) including a base tape (14) and a transparent overlay tape (24), said apparatus comprising:

a) a pair of pressure rollers mounted for rotation about parallel axes and having tangentially contacting surfaces;

b) means for feeding a continuous strip of said base tape from a first supply along a first path to pass between said pressure roller surfaces;

c) means for feeding a continuous strip of said overlay tape from a second supply along a second path to pass between said pressure roller surfaces in superposed relation to said base tape for adhesively attaching said base and overlay tapes;

d) motor means for imparting rotation to said pressure rollers to effect movement of said base and overlay tapes therebetween by frictional engagement of said rollers with said base and overlay tapes;

e) said base tape being reciprocally moveable transversely to said first path in a predetermined portion of said first path in accordance with the relative amounts of slack and tension in the part of said base tape in said portion of said first path;

f) a moveable member positioned for physical contact with and movement by said part of said base tape in response to said reciprocal movement of said base tape in said predetermined portion of said first path; and g) activating means for controlling operation of said motor means in response to the position of said moveable member.

18. The apparatus of claim 17 wherein said moveable member is mounted for pivotal movement about an axis perpendicular to said first path.

19. The apparatus of claim 17 and further including guide means establishing said first path of travel, said guide means being positioned between said predetermined portion of said first path and said pressure rollers.

20. The apparatus of claim 19 and further including a common support member for at least partially supporting both said guide means and said moveable member.

* * * * *